No. 724,531. PATENTED APR. 7, 1903.
D. ALBONE.
MOTOR TRACTOR FOR AGRICULTURAL PURPOSES.
APPLICATION FILED SEPT. 12, 1902.

NO MODEL.

WITNESSES:
G. V. Symes.
Hedley J. Harrop.

INVENTOR.
Dan Albone.
Per Robert S. Phillips
Attorney.

UNITED STATES PATENT OFFICE.

DANIEL ALBONE, OF BIGGLESWADE, ENGLAND.

MOTOR-TRACTOR FOR AGRICULTURAL PURPOSES.

SPECIFICATION forming part of Letters Patent No. 724,531, dated April 7, 1903.

Application filed September 12, 1902. Serial No. 123,135. (No model.)

*To all whom it may concern:*

Be it known that I, DANIEL ALBONE, a subject of the King of Great Britain, residing at the "Ivel Works," Biggleswade, in the county of Bedford, England, have invented a new and useful Improvement in Motor-Tractors for Agricultural Purposes, (for which I have applied for Letters Patent in the United Kingdom of Great Britain and Ireland, numbered 3,920 and bearing date the 15th of February, 1902,) of which the following is a full and complete specification.

The present invention relates to a mechanical tractor for agricultural purposes which is also applicable for use as a portable motor; and it consists of the particular combination of parts and mechanisms illustrated in the accompanying drawings, in which—

Figure 1:
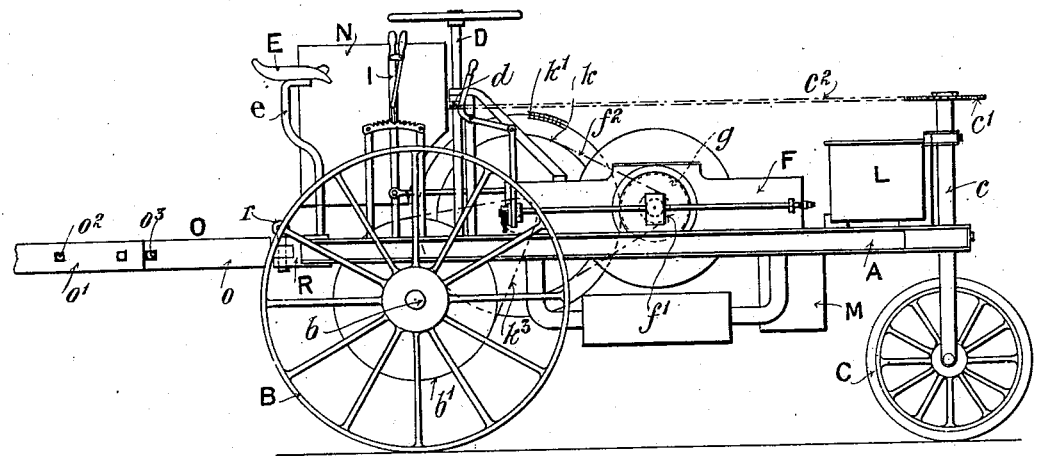
Figure 2:
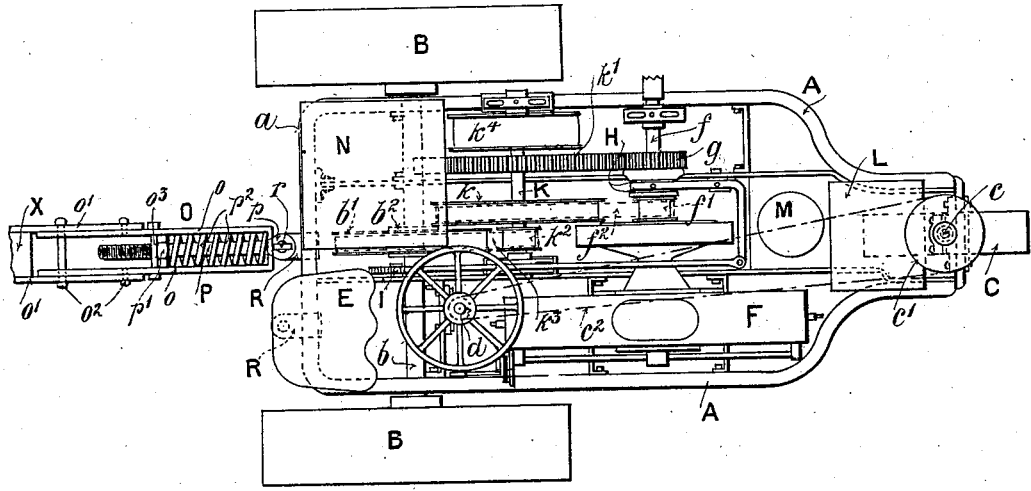

Figure 1 is a view in side elevation of the tractor, and Fig. 2 is a view in plan thereof.

Throughout both views similar parts are denoted by like letters of reference.

On the rear of a frame A, carried in suitable bearings thereon, is a pair of driving-wheels B, mounted on a balance-geared axle $b$, and at the forward end of said frame is carried a steering-wheel C, on the stem $c$ of which is mounted a fixed sprocket-wheel $c'$, geared to a second sprocket-wheel $d$, fixed onto a steering-pillar D, mounted on the rear of the frame, by means of a chain $c^2$. On one side of the rear end of the frame, in close proximity to the steering-pillar D, is carried a seat-pillar $e$, provided with a seat E for the driver. At or about the center of the frame and on one side thereof is mounted an internal-combustion engine F of any suitable type, the main shaft $f$ of which is arranged transversely in suitable bearings carried on the frame. Loosely mounted on this shaft $f$ are gear-wheels $f'$ $g$, either of which may be clutched to the shaft by means of a clutch H, preferably of the friction type, operated from a lever I, positioned near the seat E, by suitable connecting mechanism. The gear-wheel $f'$ is preferably a sprocket-wheel gearing, by means of a chain $f^2$, with a sprocket-wheel $k$, fixed on a transversely-arranged counter-shaft K, carried by the frame. The gear-wheel $g$ is a spur-pinion gearing with a fixed spur-wheel $k'$ on the shaft K. It will thus be seen that if the clutch H is so operated as to cause the gear-wheel $f'$ to be clutched to the motor-shaft $f$ the counter-shaft K will rotate in one direction, preferably, for the forward movement of the tractor, whereas if the spur-wheel $k$ is clutched to the shaft $f$ the counter-shaft K will rotate in the reverse direction, thus providing for backward movement of the tractor, it being understood that the engine F will run free when the clutch is in such a position that neither of the gear-wheels $f'$ $g$ are clutched to their shaft. The counter-shaft K is geared with the axle $b$ by means of a sprocket-wheel $k^2$ on the shaft $k$, chain $k^3$, and sprocket-wheel $b'$, carried by the box or casing of the balance-gear $b^2$ of the axle $b$. The whole of the gearing is so arranged as to impart a uniform speed of about five miles per hour to the tractor when the motor is running at its critical speed. When it is desired to use the tractor as a stationary motor, the shaft $b$ is disconnected from the counter-shaft K, preferably by unlinking the chain $k^3$, and the power taken off from a pulley $k^4$, mounted on the shaft K for the purpose. The frame also carries a storage-tank L for the liquid hydrocarbon employed, a carbureter M of any suitable type for carbureting the air, and a water-storage tank N, containing water for cooling the motor.

The traction-bar O, which forms the connecting medium between the tractor and the agricultural implement to be drawn, consists of a forked bar $o$, attached by its prongs to the pole $x$ of the implement to be drawn by means of side plates $o'$ and screws and bolts $o^2$. A rod P, threaded at its one end to receive a nut $p'$, is located within the free or opposite end of the bar O and passes out through a hole in the crown thereof. A helical spring $p^2$ encircles the rod, abutting against the crown of the bar O at its one end and against the face of the nut $p'$, so that its strength may be varied by the said nut. A stop $o^3$ is provided to limit the movement of the rod in the other direction. The free end of the rod P is furnished with an eye $p$, which is attached, by means of a linchpin $r$, to a bracket R to the back member $a$ of the frame A. It is essential that the point of attachment of the bar O to the member $a$ of the frame A can be varied to suit the type of machine to be drawn. In the case of mowing and reaping machines and also with plows the tractor must be on one side—sometimes on the right and sometimes on the left. In others—such as seed-drills, scuffles, wagons, &c.—it may pull quite centrally. It is therefore necessary to provide two or more brackets R, as shown, or a single bracket may be used capable of being adjustably fixed on the said member $a$.

What I claim, and desire to secure by Letters Patent, is—

In a traction-engine, the combination, with a frame, road-wheels supporting the frame and provided with a balance-geared axle, and a sprocket driving-wheel $b'$ mounted on said axle at the middle part of the said frame; of a counter-shaft journaled in the said frame, a spur-wheel $k'$, a sprocket-wheel $k$, and a sprocket-pinion $k^2$ all secured side by side on the said counter-shaft, a drive-chain passing over the wheel $b'$ and pinion $k^2$, a motor-shaft journaled in the said frame, a motor arranged at one end of the motor-shaft toward one side of the said frame, a spur-pinion $g$ loose on the said motor-shaft and gearing into the wheel $k'$, a sprocket-pinion $f^2$ loose on the said motor-shaft, a drive-chain passing over the pinion $f^2$ and wheel $k$, and a slidable clutch revolving with the motor-shaft between the pinions $g$ and $f'$ and engaging with them alternately, substantially as described and shown.

DAN. ALBONE.

Witnesses:
A. MILLWARD FLACK,
G. V. SYMES.